United States Patent
Horth (10) Patent No.: US 10,359,571 B2
(45) Date of Patent: *Jul. 23, 2019

(54) MULTI-MODE INTERFEROMETER COUPLER WITH CORE STRIPS

(71) Applicant: Elenion Technologies, LLC, New York, NY (US)

(72) Inventor: Alexandre Horth, Astoria, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,952

(22) Filed: Jun. 26, 2018

(65) Prior Publication Data

US 2019/0033529 A1 Jan. 31, 2019

Related U.S. Application Data

(63) Continuation of application No. 15/658,795, filed on Jul. 25, 2017, now Pat. No. 10,031,291.

(51) Int. Cl.
*G02B 6/12* (2006.01)
*G02B 6/293* (2006.01)
*G02B 6/122* (2006.01)

(52) U.S. Cl.
CPC ....... *G02B 6/29346* (2013.01); *G02B 6/1228* (2013.01); *G02B 2006/12061* (2013.01)

(58) Field of Classification Search
USPC .................................................. 385/46, 129
See application file for complete search history.

(56) References Cited

U.S. PATENT DOCUMENTS

| 6,628,876 B1 * | 9/2003 | Shmulovich ............. G02B 6/13 |
| | | 385/129 |
| 8,676,009 B2 * | 3/2014 | Weimann ............... G02B 6/122 |
| | | 385/46 |
| 2010/0110443 A1 * | 5/2010 | Cheben ..................... G01J 3/02 |
| | | 356/454 |

* cited by examiner

*Primary Examiner* — Eric Wong
(74) *Attorney, Agent, or Firm* — Stratford Managers Corporation (57) ABSTRACT

For multi-mode interference (MMI) couplers that have a plurality of input and output ports, e.g. 4×4, a large number of modes may be supported in the multimode region, e.g. >10, as the width of the MMI core grows larger. In order for MMI couplers to form good images, the supported modes preferably have low modal phase error, which can't be achieved using a conventional single layer design. Accordingly, a multi-mode interference (MMI) coupler comprising an MMI core comprising a plurality of waveguide core strips alternating with a plurality of cladding strips solves the aforementioned problems.

15 Claims, 6 Drawing Sheets

MULTI-MODE INTERFEROMETER COUPLER WITH CORE STRIPS

CROSS-REFERENCE TO RELATED APPLICATIONS

This application is a continuation of U.S. patent application Ser. No. 15/658,795, filed Jul. 25, 2017, now allowed, which is hereby incorporated by reference herein in its entirety.

TECHNICAL FIELD

The present invention relates to a multi-mode interferometer (MMI) coupler, and in particular to an MMI coupler with a core comprised of waveguide strips.

BACKGROUND

Figure 1A:
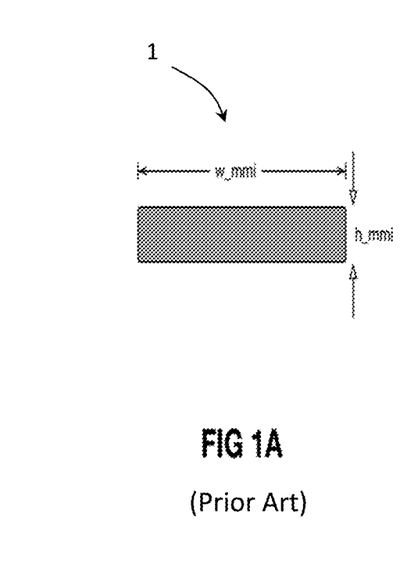
FIG. 1A: illustrates a cross-section of a conventional single layer MMI coupler.
Figure 2A:
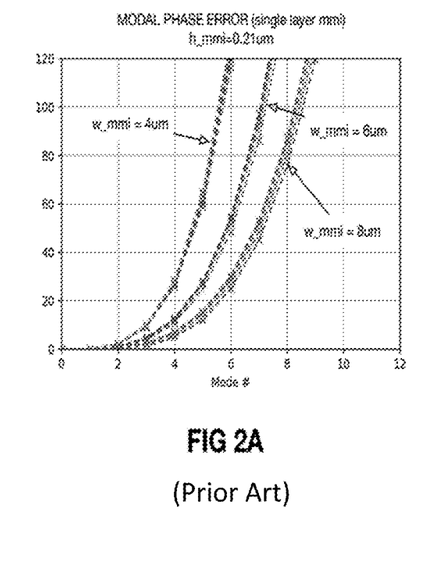
FIG. 2A: illustrates a plot of modal phase error for a standard single layer MMI coupler.

Conventional multimode interferometers (MMI) couplers 1, illustrated in FIG. 1A, are fabricated from a single layer of waveguide material, e.g. silicon, including a width w_mmi and a thickness h_mmi, typically 220 nm thick. Single layer MMI couplers result in a high modal phase error, which prevents the formation of good images essential to the realization of a good MMI, characterized by a low insertion loss, small power imbalance, high common mode rejection ratio (CMRR), and small phase error. For an MMI coupler with a smaller number of input/output (IO) ports, such as 1×2 and 2×2, the high modal phase error of the MMI coupler is partly mitigated by the fact that only a very limited number of modes are supported in the MMI region, e.g. 2 to 4 modes. For MMI couplers that have a large number of IO ports, such as a 4×4, there is inevitably a larger number of supported modes in the multimode region, typically >10, as the width of the MMI core grows larger, and in order for these MMI couplers to form good images, the supported modes must have low modal phase error, which can't be achieved using a single layer of waveguide material, e.g. silicon. FIG. 2A illustrates a plot of phase error vs number of modes for a standard single layer MMI coupler 1 including different widths w_mmi, e.g. 4 um, 6 um and 8 um, and a single height h_mmi 0.21 um. The phase error grows exponentially with the number of supported modes and for each width w_mmi.

Figure 1B:
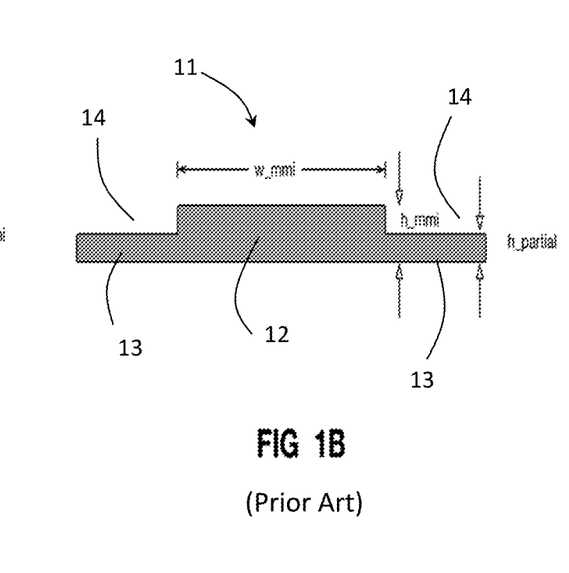
FIG. 1B: illustrates a cross-section of a conventional dual layer MMI coupler.
Figure 1C:
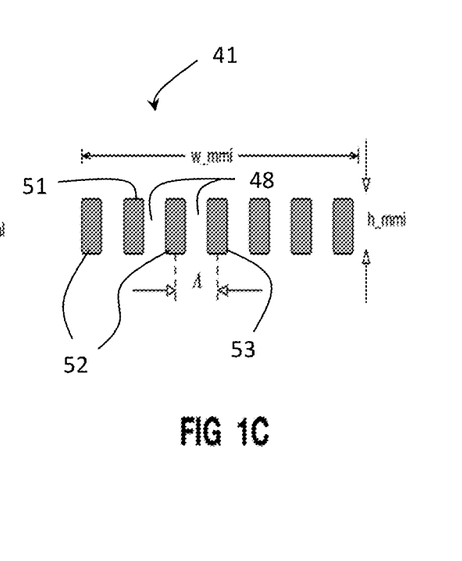
FIG. 1C: illustrates a cross-section of a MMI coupler with core stripes in accordance with an embodiment of the present invention.
Figure 2B:
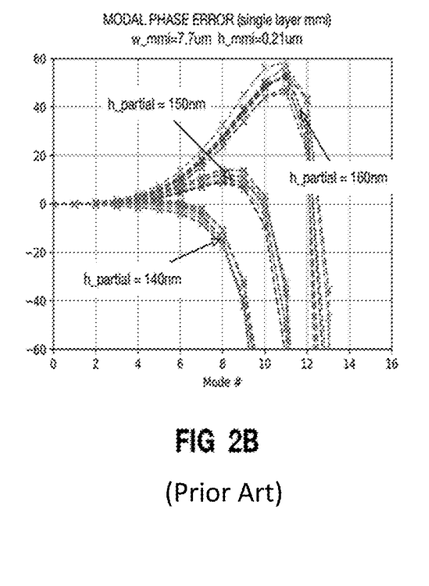
FIG. 2B: illustrates a plot of modal phase error for a dual layer MMI coupler.

In order to realize an MMI coupler with a large number of input/output ports, such as a 4×4 MMI coupler, e.g. on a semiconductor (silicon) photonics platform, a dual layer MMI coupler 11, as illustrated in FIG. 1B, is usually comprised of a central core region 12, including a width w_mmi and a thickness h_hmmi, typically 220 nm thick, and a partially etched layer 13 including a height h_partial extending from each side of the central section 12. The partially etch layer 13 effectively reduces the index contrast between the core region 12 of the MMI coupler 11 and its side cladding 14 by increasing the index of the side cladding 14. The partially etched layer 13 provides the extra degree of freedom needed to control the effective indices of the supported modes, which can be used to minimize the modal phase error. In practice, dual layer MMI couplers 11 are very sensitive to the relative thickness of the full-height waveguide 12 versus the partially etch waveguide 13; therefore, when these MMI couplers are fabricated, thickness variation as small as 10 nm between the designed MMI coupler and the fabricated MMI coupler can result in unacceptable loss, balance, CMRR, and phase error. FIG. 2B illustrates a plot of modal phase error vs number of modes for a dual layer MMI coupler 11, for MMI's with different partial etch layer heights h_partial, but constant widths w_mmi or 7.7 um and heights h_mmi of 0.21 um. The dual layer MMI coupler 11 achieves smaller modal phase error than the single layer MMI coupler 1, but is sensitive to the thickness of the partial etch layer 13.

Figure 3A:
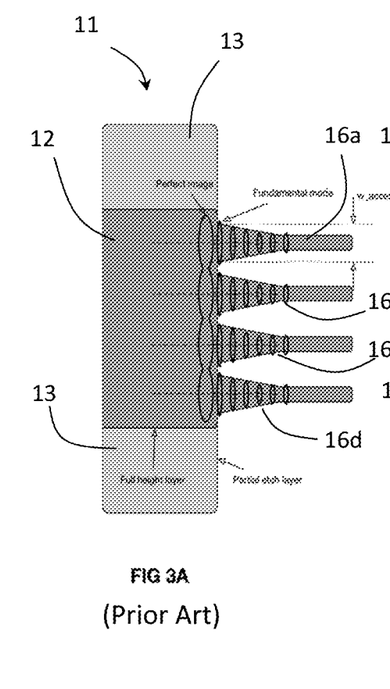
FIG. 3A: illustrates the geometry of access ports in a standard dual-layer MMI coupler including the theoretical electromagnetic field of key optical modes.
Figure 3B:
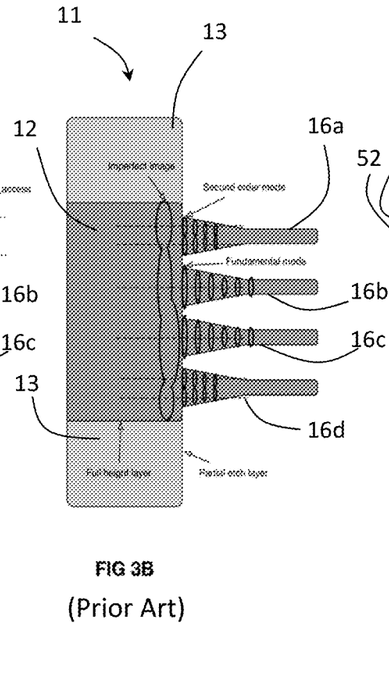
FIG. 3B: illustrates the geometry of access ports in a standard dual-layer MMI coupler including the practical electromagnetic field of key optical modes.

With reference to FIGS. 3A and 3B, both single and dual layer MMI couplers typically have single-layer, full-height access ports 16a-16d. The width of the access ports (w_access) is typically optimized for maximal coupling to the $N^{th}$ or $M^{th}$ order mode of the MMI core 12 of an N×M port MMI coupler 11, respectively. This optimal access port width, e.g. 1 µm to 2 µm on SOI 220 nm platform, is almost always wide enough to support multi-modes, e.g. w_access>0.5 µm. In theory, the light coming from the core 12 of the MMI coupler 11 forms an image that aligns with the access ports 16a-16d both in position and size, and the higher order access modes are not excited, as illustrated in FIG. 3A. In actuality, because of thickness variation in the layers, lithographic rounding, refractive index variations, wavelength dispersion, etc. the image that actually forms at the outputs 16a-16d of the MMI coupler 11 is distorted, as illustrated in FIG. 3B. The distortions are asymmetrical to the position and size of the access ports 16a-16d, which promotes coupling to high order modes supported in the access ports, as depicted in the bottom and top ports 16a and 16d. The relative phase shift between the high order modes and the fundamental mode of interest quickly accumulates in the access ports 16a-16d given the taper resulting in significant phase shift at the end of the taper where the width reaches the routing waveguide width. This results in the creating of highly undesirable ripples especially observable in phase. Note that each port 16a-16d can support the fundamental and higher order modes, such as the depicted second order mode, and that coupling to these modes can happen at each of the ports 16a-16d.

An object of the present invention is to overcome the shortcomings of the prior art by providing an MMI coupler with a core comprise of strips of waveguide material and strips of cladding material.

SUMMARY OF THE INVENTION

Accordingly, the present invention relates to multi-mode interference (MMI) coupler comprising:
an MMI core comprising a plurality of waveguide core strips alternating with a plurality of cladding strips.
at least one input port extending from one side of the MMI core for optically coupling to a respective input waveguide; and
at least one output port extending from another side of the MMI core for optically coupling to a respective output waveguide.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIGS. 1C, 3C, 4A, 4B and 4C, an MMI coupler 41 in accordance with an embodiment of the present invention, includes an MMI core 42, including a core width w_mmi, with input ports 43 extending from one side of the MMI core 42, and output ports 44 extending from an opposite side of the MMI core 42. Ideally, the MMI core 42 comprises a single-layer, sub-wavelength MMI core. The term subwavelength is used to describe an object having one or more dimensions smaller than the length of the wave with which the object interacts. For example, the term subwavelength-diameter optical waveguide means an optical waveguide whose diameter is less than the wavelength of light propagating through it. The input and output ports 43 and 44 may be single mode ports. The input and output ports 43 and 44 have been labelled as such for simplicity; however, the MMI coupler 41 may be bidirectional, whereby the input ports may be capable of outputting signals, and the output ports 44 may be capable of inputting signals, whereby both input and output ports 43 and 44 may be referred to as access ports or input/output ports. In the illustrated embodiment four input ports 43 and four output ports 44 are provided, but any number from 1 to N is possible. First routing waveguides 46 extend from the input ports 43, and second routing waveguides 47 extend from the output ports 44 for optically coupling the MMI coupler 41 to external optical waveguides or devices. The first and second routing waveguides 46 and 47 include a width w_routing.

The MMI coupler 41 is ideally comprised of silicon, but other suitable higher-index waveguide materials, e.g. semiconductor materials such as InP and GaAs or dielectric materials such as SiO2 and SiN, are within the scope of the invention.

Figures 4A, 4B, 4C:
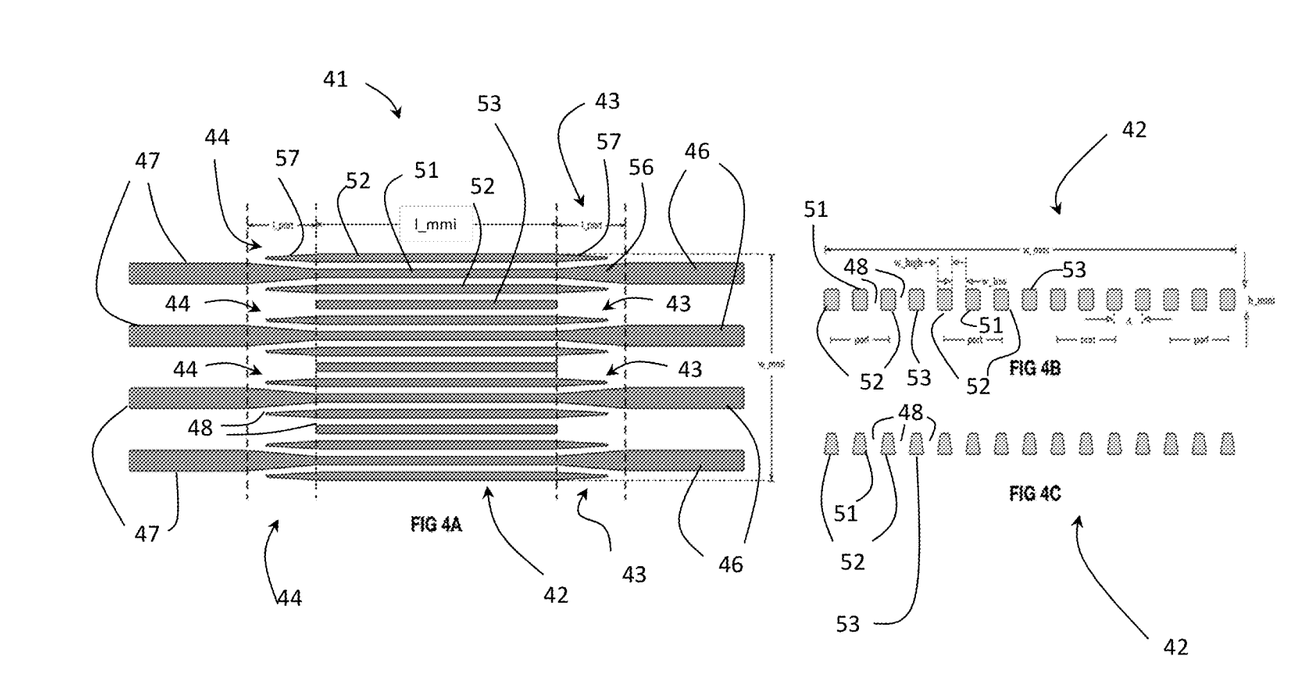
FIG. 4A: illustrates a plan view of the MMI coupler according to an embodiment of the present invention.
FIG. 4B: illustrates a cross-sectional view of the MMI core of MMI coupler of FIG. 4A.
FIG. 4C: illustrates a cross-sectional view of the MMI core of the MMI coupler of FIG. 4A with rounding and etch profile.

The MMI core 42 comprises a plurality of waveguide core strips separated by and alternating with strips of cladding 48, which may include a substantially constant width w_low, and may comprises glass, air or some other suitable material with an index of refraction lower than the waveguide core strips, such as polymers or nitrides. The waveguide core strips may be substantially parallel to each other and the strips of cladding 48, but other non-parallel arrangements are possible. The plurality of waveguide core strips may include central strips 51, tapering side strips 52, and spacer strips 53. All of the waveguide core strips may each have the same constant width throughout their length, or all of the same type of waveguide core strip, e.g. tapering side strips 52, may have the same constant width, but different than another type of waveguide core strip, throughout their length. Alternatively, each waveguide core strip may have a different constant width throughout their length. The widths of the waveguide core strip may also vary throughout their lengths.

Each input port 43 includes a tapering section 56 extending between one of the respective first routing waveguides 46 and the corresponding central strip 51. The tapering section 56 includes a width that tapers, e.g. linearly or exponentially, down from the width of the first routing waveguide 46 w_routing to the width of the central strip 51 w_high for input ports 43 or that expands, e.g. linearly or exponentially, up from the width of the central strip 51 w_high to the width of the first routing waveguide 46 w_routing for output ports 44. Each input port 43 also include ends 57 of tapering side strips 52 extending along each side of the tapering section 56. The ends 57 of the tapering side strips 52 in the input ports 43 may expand from a minimum width, e.g. a substantially pointed end defined as a critical dimension supported by the fabrication process, to a width w_high, as the tapering section 56 tapers down to the width w_high, which can be substantially the same or different than the width w_high of the central strip 51. Ideally, the minimum width of the outer free end of the ends 57 is as small a dimension as the fabrication process allows; however, larger than possible minimum widths are also possible and within the scope of the invention, in particular if operating specifications allow. In the output ports 44, the ends 57 of the tapering side strips 52 may taper from the width w_high to a minimum width, e.g. a substantially pointed end, defined as a critical dimension supported by the fabrication process, as the tapering section 56 expands from the width w_high to the width w_routing. Ideally, the minimum width of the outer free end of the ends 57 is as small a dimension as the fabrication process allows; however, larger than possible minimum widths are also possible, in particular if operating specifications allow. The spacer strips 53 extend adjacent to the tapering side strips 52. There may be one or more spacer strips 53 between tapering side strips 52 or the spacer strips 53 may be omitted altogether. The spacer strips 53 may have the same width w_high as the central strip 51 and the side strips 52 or they may have a wider or thinner width.

Figure 3C:
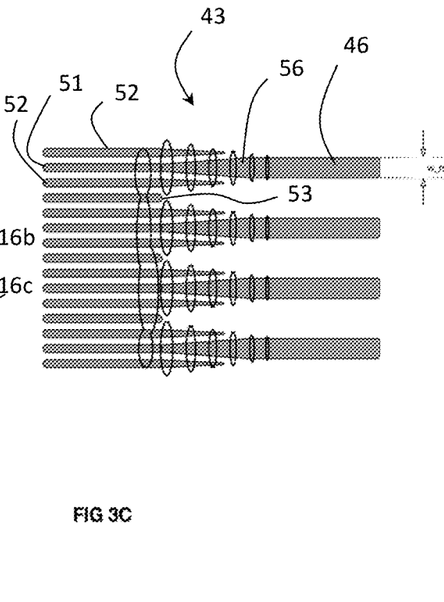
FIG. 3C: illustrates the geometry of access ports in an MMI coupler in accordance with an embodiment of the present invention, including the practical electromagnetic field of key optical modes.

With reference to FIG. 3C, in comparison to prior art input ports 16a to 16d, the input routing waveguides 46 are tapered from the routing width (w_routing) to the width of central strip 51 of the MMI core 42 forming the tapering section 56. By tapering the routing waveguide 46 to a smaller width, single mode operation is ensured. At the same time that the tapering section 56 of the central strip 51 is tapered, two interleaved tapers on the side strips 52 ensure that the mode expands in a ellipsoidal manner and ensures that the mode connects to the MMI core 42 with a geometry such that it perfectly matches the three strips, i.e. central strip 51 and two side strips 52, of the MMI core 42. Even in the case that the image formed by the MMI coupler 41 is imperfect (as depicted), no phase ripples would be observed in transmission given the single mode nature of the access ports 43 and 44.

FIGS. 4B and 4C illustrate how the cross-section of the MMI core 42 compares to regular MMI's, e.g. FIGS. 1A and 1B. First, the single layer approach is very desirable since dual layer designs are impractical given their intrinsic sensitivity to the thickness of the partial layer. Moreover, a single layer approach simplifies the fabrication process.

Second, the sub-wavelength approach reduces the refractive index of the MMI core 42 by segmenting the MMI core 42 into a plurality of optically coupled strips, e.g. 51, 52 and 53, which effectively reduces the index contrast between the MMI core 42 and the cladding 48 resulting in low modal phase error required for good imaging. The sub-wavelength approach also provides more degree of freedom, e.g. period (A), number of periods, fill factor and length, than dual layer designs which makes it easier to achieve given performance spec. Further, these degrees of freedom are all lithographically defined, which is much easier to control than parameters, such as the thickness of a partially etched layer.

Third, the sub-wavelength MMI coupler design may use single mode, adiabatic access port tapering. The access ports 43 and 44 are intuitively designed by simply extending the length of the some of the MMI's core strips 51 and 52, and by using interleaved tapers. Low reflection is guaranteed since there are no hard interfaces. Good modal matching between the mode of the access ports 43 and 44 and the mode of the MMI core 42 is ensured, since both use a very similar sub-wavelength structure. Also, since the access ports 43 and 44 may be single mode, their tapering and expanding sections are easily made adiabatic and short, ensuring low loss and ripple free transmission.

FIG. 4B illustrates a typical cross-section of the MMI core 42, and outlines the various degrees of freedom, which can be manipulated during manufacture until a desired or threshold performance characteristic, e.g. loss, balance, CMRR, and phase error, is obtained. For example: 1) the period (A), i.e. the distance between the central axis of adjacent core strips; 2) the fill factor (ff) defined by w_high/(w_high+ w_low); 3) the width of the MMI core 42 (w_mmi) determined by the number of periods and the numbers of ports 43 and 44; 4) the height of the MMI core 42 (h_mmi), which is typically determined by the selected photonics platform; and 5) the length of the MMI core (l_mmi) determined by length of the strips 53.

In the embodiment illustrated in FIG. 4B, the cross-section of the MMI 41 is comprised of fifteen strips of waveguide material, e.g. silicon. Ideally, for a MMI 41 with N input and output ports, the MMI core 42 is comprised of N central strips 51, N×2 side strips 52, and N−1 spacer strips 53; however, additional side strips 52 are possible, as well as more or less spacer strips 53. Each access port 43 and 44 may be comprised of the ends of three strips, e.g. one central strip 51 and two tapering side strips 52. Typically, one spacer strip 53 may be used as a spacer between the access ports 43 and 44, although zero or two or more spacer strips 53 are possible.

Figure 2C:
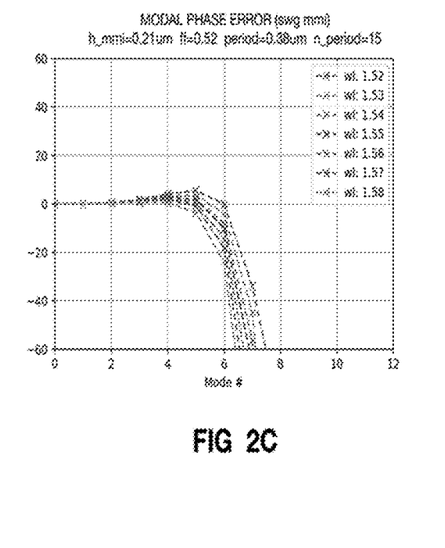
FIG. 2C: illustrates a plot of modal phase error for an MMI coupler in accordance with an embodiment of the present invention.

An example 4×4 MMI coupler 41 includes a fill factor of 0.45 to 0.55 (w_high=180 nm to 220 nm, w_low=160 nm to 200 nm), a period of 350 nm to 400 nm, and is composed of 12 to 18 core strips resulting in a theoretical 4-fold imaging distance of 50 μm to 55 μm. FIG. 2C illustrates a plot of modal phase error for an example 4×4 MMI coupler 41 for various wavelengths ranging from 1520 nm to 1580 nm. Depending on the number of access ports 43 and 44, the number of strips that comprise each port 43 and 44 could change. Access ports 43 and 44 have been design using three strips; however, they could have been designed to connect to an arbitrary number of core strips, e.g. 1, 2, 3, 4 . . . . The choice mainly depends on the number of access ports 46 and 47, and on the achievable critical dimension of the fabrication process. Typically, a smaller number of strips are required for a smaller number of access ports 43 and 44.

Note that the MMI coupler design of the present invention is robust to fabrication rounding or non-ideal etch profile, as illustrated in FIG. 4C. An important parameter is the volumetric fill factor representing the volumetric ratio between waveguide, e.g. silicon, and cladding material. Moreover, the design is quite robust to changes in fill factor; for the geometry proposed, fill factors ranging between 0.5 to 0.55, e.g. w_high=190 nm to 210 nm, corresponds to an optimal imaging distance of 52.4 μm to 52.8 μm with the modal phase error remaining smaller than +/−40° for all the supported modes. In other words, given a fabrication target of +/−5% on width of w_high, e.g w_high=200 nm+/−10 nm, the associated MMI length would only vary by 52.6 m+/−0.2 μm or 0.3%. Comparatively, a typical dual layer design, as illustrated in FIG. 2B, with partial etch target of +/−5%, e.g. h_partial=150 nm+/−8 nm, would change the optimal imaging length by 115.8 m+/−1.8 um or 1.6%. Note also, that the MMI coupler 41 has a much smaller footprint.

Figure 5:
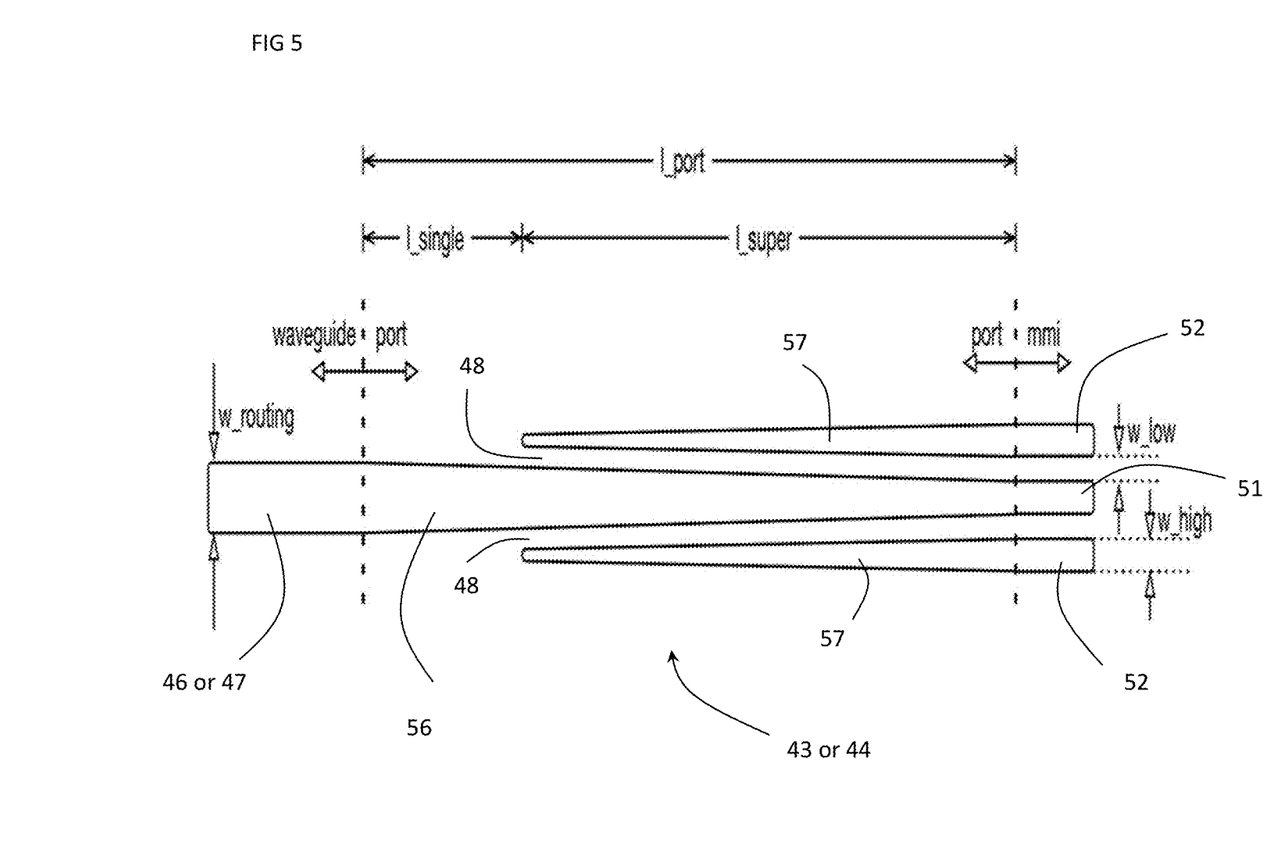
FIG. 5 illustrates a plan view of an access port of the MMI coupler of FIG. 4A.

FIG. 5, illustrates the main sections of one of the access port, e.g. input port 43 or output port 44. The tapering section 56, extends between the center strip 51 and the routing waveguide 46 or 47, and tapers in width from the width w_routing of the central strip 52 to the width of the central strip w_high for the input ports 43 or expands in width from the width w_high of the central strip 51 to the width of the routing waveguide w_routing for the output ports 44. For the output ports 44, an initial portion of the tapering section 56 is interleaved with, i.e. sandwiched between, the ends 57 of the side strips 52, which taper down from w_high to substantially a point at about ¾ of the length of the output port 44 or l_super as the tapering section 56 expands from w_high. The remaining portion of the tapering section 56 expands over a length l_single, which represents about ¼ the total port length l_port of the output port 44, until coupling with the routing waveguide 47 with only cladding 48 on opposite sides thereof.

For the input ports 43, an initial portion of the tapering section 56 tapers from the width w_routing of the routing waveguide 46 over a length l_single, which represents about ¼ the total port length l_port of the input port 43 with only cladding strips 48 on opposite sides thereof. A remaining portion of the tapering section 56 is interleaved with, i.e. sandwiched between, the ends 57 of the side strips 52, which expand from a minimum width, e.g. substantially a point, defined as a critical dimension supported by the fabrication process, at about ¾ of the length of the input port 43, i.e. l_super, to a width w_high, as the tapering section 56 tapers down to w_high. Ideally, the minimum width of the outer free ends of the ends 57 is as small a dimension as the fabrication process allows; however, larger than possible minimum widths are also possible and within the scope of the invention, in particular if operating specifications allow.

The gap between each of the tapering sections 56 and 57 of the strips 51 and 52, respectively, may be fixed at the spacing width w_low, i.e. the width of the cladding strip 48 in the MMI core 42, to ensure that strips in the access ports 43 and 44 exactly matches the MMI geometry once they reach the MMI core 42. Over the length l_super, the mode will form a super mode composed of all three strips, e.g. central strip 51 and two side strips 52, and the cladding 48 therebetween. In a preferred embodiment, a total access port length of l_port=12-18 um provides adiabatic mode transformation.

Figure 6:
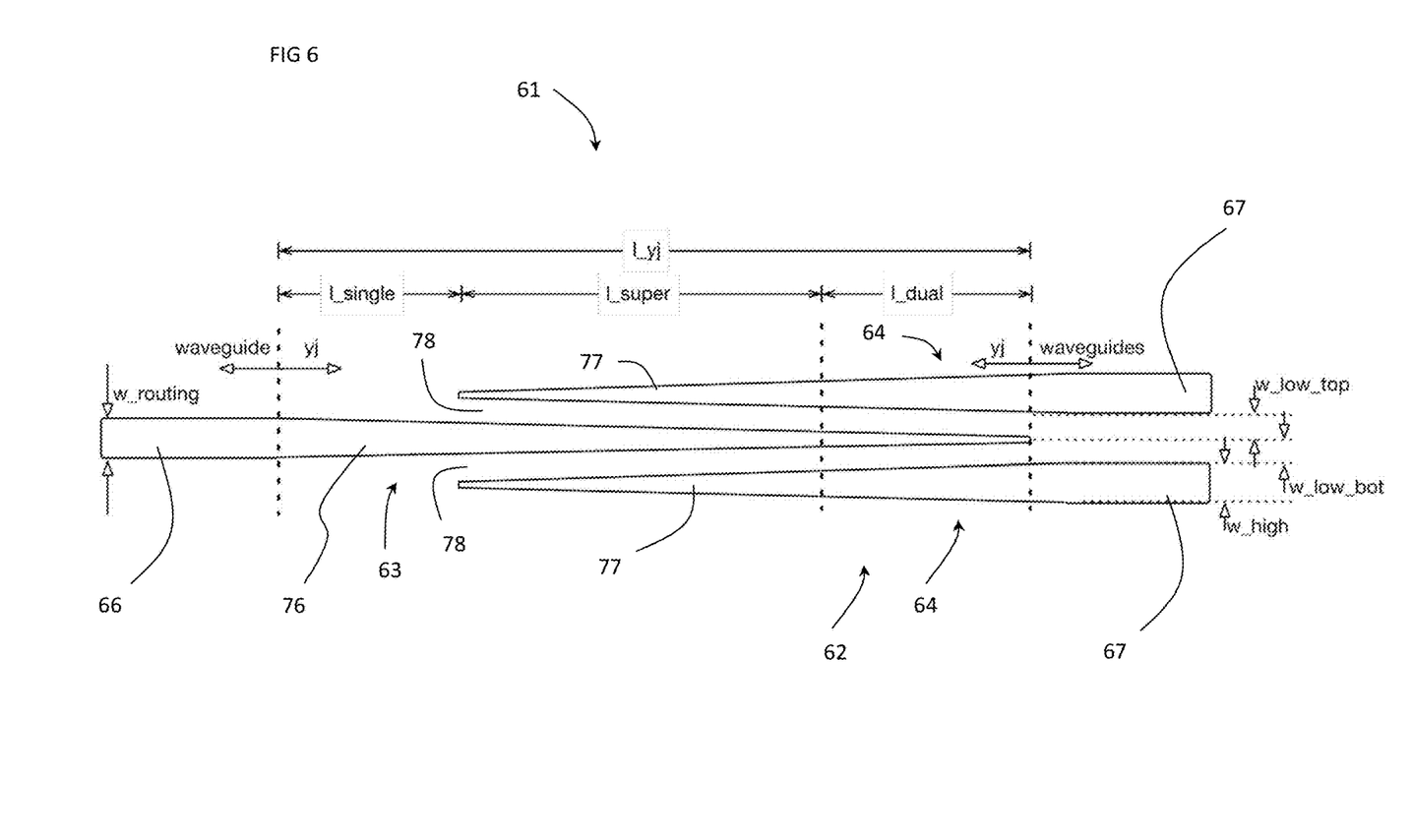
FIG. 6 illustrates a plan view of an MMI coupler in accordance with another embodiment of the present invention.

FIG. 6, illustrates an alternative embodiment of an MMI coupler 61, including an MMI core 62 with at least three access ports, e.g. an input port 63 and first and second output ports 64. In the illustrated device 61, which comprises a Y-junction splitter, the access ports 64 can also be considered the MMI core 62. Only a single mode is supported over the length l_single+l_super, which may comprise the input (or output) port 63, but then a multi-mode region is supported over the length l_dual, which may be considered the MMI core 62 and the first and second output (or input) ports 64. Extending from an end of an input (or output) waveguide 66, the input port 63 includes a tapering section 76, which after a length l_single, becomes sandwiched between first and second expanding sections 77, with cladding strips 78 therebetween, as hereinbefore disclosed. The first and second expanding sections may expand from a minimum width, e.g. substantially a point defined as a critical dimension supported by the fabrication process, into the width intermediate that of the outer free end and of the output waveguide 67 w_routing, after the length l_super. At the output (or input) end, an extension of the tapering section 76 is reduced to a minimum width, e.g. substantially a point defined as the critical dimension supported by the fabrication process, which opens a gap (w_low_top+w_low_bot) between the two output waveguides 67. Extensions of the expanding sections 77 expand from the intermediate width to the width of the output (or input) waveguides 67 over the length l_dual. Note that there are no hard interfaces in the optical path, which ensures low back-reflection from the coupler 61. Further, the coupler 61 is broadband provided that the critical dimension width of the process is much smaller than the effective wavelength, it also not very sensitive to the polarization state. Ideally, the minimum width of the outer free ends of the ends 76 and 77 is as small a dimension as the fabrication process allows; however, larger than possible minimum widths are also possible and within the scope of the invention, in particular if operating specifications allow.

A balanced y-junction (50:50) split can be made by making the ratio w_low_bot/w_low_top=1, i.e. ensuring that the end of the tapering section 76 is equa-distant between the ends of the expanding sections 77. However, unbalanced splitting (e.g. 60:40, 70:30, 80:20, 90:10) can be made by changing this ratio, i.e. the distances between the end of the tapering section 76 and the ends of the expanding sections 77. Ideally, the distances between the tapering section 76 and each expanding section 77, i.e. the width of the cladding strips 78 therebetween, are constant along their respective lengths. Additional access ports 63 and/or 64 may be added by simply adding additional input waveguides 66, tapering sections 76, expanding sections 77, and output waveguides 67. Spacer strips may also be provided between expanding sections 77.

Changing the fill factor, period (Λ) of each strip 51, 52 and 53 as a function of the length l_mmi of the MMI core 42 could help reducing wavelength dependency of the MMI coupler 41.

A partial etch layer could be used such that it would partially fill the grating of the MMI core 42 and 62, whereby each cladding strip 48 and 78 includes a layer of higher index waveguide material, typically the same as the material making up the waveguide core strips. The layer of waveguide material may be $\frac{1}{10}$ to $\frac{7}{10}$ of the full height, preferably $\frac{4}{10}$ to $\frac{6}{10}$. The full height strips would help with the fabrication process since they provide a constant density of waveguide material which helps achieve more accurate partial etch.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An optical coupler comprising:
   a first waveguide comprising a first input waveguide section extending from one side of the coupler, and a first tapering section tapering from a maximum width down to a minimum width;
   a second waveguide comprising a first output waveguide section extending from another side of the coupler, and a first expanding section adjacent to the first tapering section expanding from a minimum width up to a maximum width, the first expanding section expanding as the first tapering section tapers;
   a third waveguide comprising a second output waveguide section extending from the other side of the coupler, and a second expanding section adjacent to the first tapering section expanding from a minimum width up to a maximum width, the second expanding section expands as the first tapering section tapers;
   a first cladding strip between the first tapering section and the first expanding section, and
   a second cladding strip between the first tapering section and the second expanding section.

2. The coupler according to claim 1, wherein the first, second and third waveguides, comprise silicon.

3. The coupler according to claim 2, wherein the coupler is bidirectional; whereby the first input waveguide section comprises a first input/output waveguide section, the first output waveguide section comprises a second input/output waveguide section, and the second output waveguide section comprises a third input/output waveguide section.

4. The coupler according to claim 1, wherein about ¼ of a length of the first tapering section extends with only the first and second cladding strips on either side thereof; and wherein about ¾ of the length of the first tapering section extends interleaved with the first and second expanding sections.

5. The coupler according to claim 1, wherein each of the first and second output waveguide sections comprises a same constant, maximum width (w_high).

6. The coupler according to claim 5, wherein the maximum width (w_high) of each of the first and second output waveguide section is between 180 nm and 220 nm.

7. The coupler according to claim 5, wherein each of the first and second cladding strips comprises a same constant width (w_low).

8. The coupler according to claim 7, wherein the width (w_low) of each of the first and second cladding strip is between 160 nm and 200 nm.

9. The coupler according to claim 1, wherein each of the first and second cladding strips includes a layer of waveguide core material.

10. The coupler according to claim 9, wherein the layer of waveguide core material is ⁴⁄₁₀ to ⁶⁄₁₀ of a full height of the first and second cladding strips.

11. The coupler according to claim 1, wherein an outer free end of the first tapering section is equidistant between ends of the first and second expanding sections providing a 50/50 splitting ratio between the first and second output waveguide sections.

12. The coupler according to claim 1, wherein an outer free end of the first tapering section is spaced differently from ends of the first and second expanding sections, providing an unbalanced splitting ratio between the first and second output waveguide sections.

13. The coupler according to claim 1, further comprising:
a fourth waveguide comprising a second input waveguide section extending from the one side of the coupler, and a second tapering section extending adjacent to the second expanding section of the third waveguide.

14. The coupler according to claim 13, further comprising:
a fifth waveguide comprising a third output waveguide section extending from the other side of the coupler, and a third expanding section adjacent to the second tapering section, the third expanding section expanding as the second tapering section tapers.

15. The coupler according to claim 1, wherein the minimum width of each of the first tapering section and the first and second expanding sections comprises a point defined as a critical dimension supported by a fabrication process.

* * * * *